US012436398B1

(12) United States Patent
Zhang et al.

(10) Patent No.: US 12,436,398 B1
(45) Date of Patent: Oct. 7, 2025

(54) CAMERA ARCHITECTURES FOR COMBINED EYE-TRACKING AND OUTWARD-TRACKING

(71) Applicant: Bytedance Technology Ltd., Grand Cayman (KY)

(72) Inventors: Bowei Zhang, Los Angeles, CA (US); Runyu Liu, Los Angeles, CA (US); Chien Hung Lu, Los Angeles, CA (US)

(73) Assignee: Bytedance Technology Ltd., Grand Cayman (KY)

( * ) Notice: Subject to any disclaimer, the term of this patent is extended or adjusted under 35 U.S.C. 154(b) by 0 days.

(21) Appl. No.: 19/192,134

(22) Filed: Apr. 28, 2025

(51) Int. Cl.
  *G02B 27/01* (2006.01)
  *G02B 5/20* (2006.01)

(52) U.S. Cl.
  CPC ......... *G02B 27/0179* (2013.01); *G02B 5/201* (2013.01); *G02B 27/0172* (2013.01);
  (Continued)

(58) Field of Classification Search
  CPC G02B 27/0179; G02B 5/201; G02B 27/0172; G02B 2027/0138; G02B 2027/0178; G02B 2027/0187; G02B 27/01; G02B 27/0101; G02B 27/0103; G02B 27/0149; G02B 27/017; G02B 27/0176; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/013; G02B 2027/0129; G02B 2027/0132; G02B 2027/0134; G02B 2027/0136; G02B 2027/0141; G02B 2027/014; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183;
  (Continued)

(56) References Cited

U.S. PATENT DOCUMENTS

2023/0259205 A1* 8/2023 Song ............... G06V 40/18
                                                    345/156

* cited by examiner

*Primary Examiner* — Henry Duong
(74) *Attorney, Agent, or Firm* — Alleman Hall & Tuttle LLP

(57) ABSTRACT

Implementations of camera architectures for combined eye-tracking and outward-tracking are provided. One example includes a near-eye device comprising: a frame comprising an arm; an eye illuminator disposed on the arm of the frame, wherein the eye illuminator is configured to project light to an eye of a user; an imaging system disposed on the arm of the frame, wherein the imaging system comprises: an image sensor; and a color filter array comprising: a first set of filters for allowing the projected light from the eye illuminator to pass; and a second set of filters for allowing visible light to pass; and a lens comprising an optical element for: directing the projected light from the eye illuminator to the eye of the user; and directing light reflected off the eye of the user to the imaging system.

20 Claims, 10 Drawing Sheets

(52) U.S. Cl.
CPC ............... *G02B 2027/0138* (2013.01); *G02B 2027/0178* (2013.01); *G02B 2027/0187* (2013.01)

(58) Field of Classification Search
CPC ...... G02B 2027/0185; G02B 2027/019; G02B 2027/0192; G02B 2027/0194; G02B 2027/0196; G02B 2027/0198
USPC ........................................................ 359/630
See application file for complete search history.

CAMERA ARCHITECTURES FOR COMBINED EYE-TRACKING AND OUTWARD-TRACKING

BACKGROUND

Augmented-reality/mixed-reality near-eye devices, such as smart glasses, are wearable devices that superimpose digital content onto the user's real-world field-of-view. Generally, this is performed via a projection system mounted on the near-eye device that projects image light containing the digital content onto the user's eyes. In combination with transparent lenses, this allows the user to see both the digital content and the real-world environment. Augmented-reality/mixed-reality near-eye devices typically incorporate cameras and sensors to capture and analyze the surrounding environment to provide relevant information that can be used to overlay the digital content in a more realistic way.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Implementations of camera architectures for combined eye-tracking and outward-tracking are provided. One example includes a near-eye device comprising: a frame comprising an arm; an eye illuminator disposed on the arm of the frame, wherein the eye illuminator is configured to project light to an eye of a user; an imaging system disposed on the arm of the frame, wherein the imaging system comprises: an image sensor; and a color filter array comprising: a first set of filters for allowing the projected light from the eye illuminator to pass; and a second set of filters for allowing visible light to pass; and a lens comprising an optical element for: directing the projected light from the eye illuminator to the eye of the user; and directing light reflected off the eye of the user to the imaging system.

DETAILED DESCRIPTION

Figure 1:
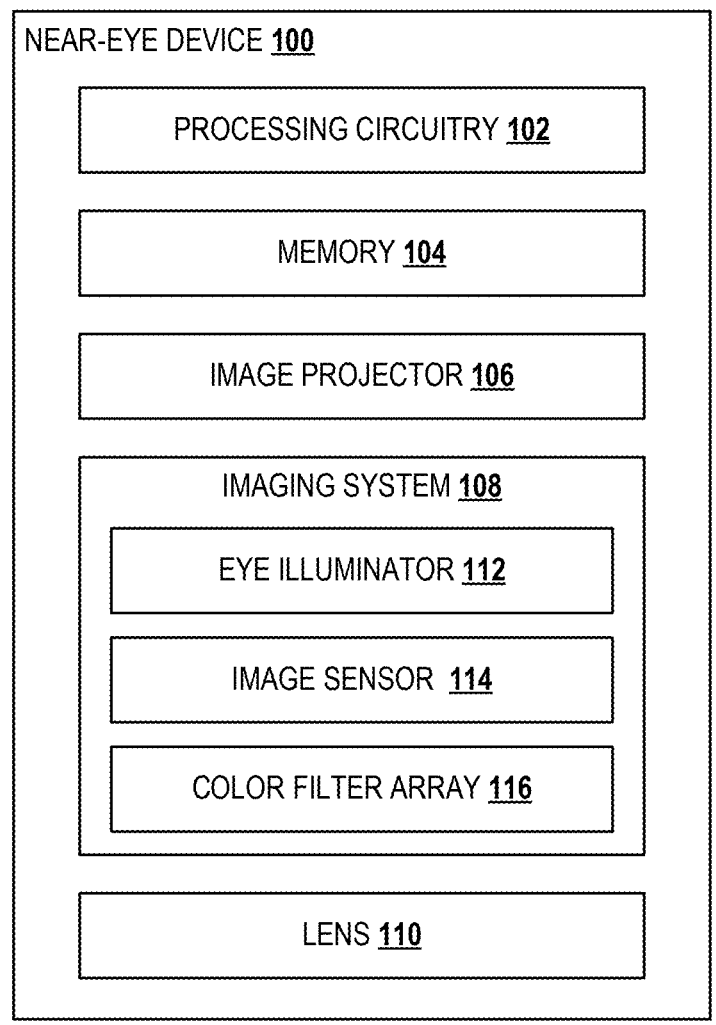
FIG. 1 shows a schematic view of an example near-eye device implementing combined eye-tracking and outward-tracking.

Augmented-reality/mixed-reality (AR/MR) near-eye devices (e.g., smart glasses and other head-mounted displays) include various on-device components and systems to support AR/MR and other functionalities. Generally, near-eye devices include image projection systems for projecting image light to users' eyes. The image light provides digital content that is overlaid on top of a real-world view through transparent lenses to enable AR/MR. Near-eye devices also commonly include tracking and imaging systems that can sense and record information to enable various functionalities. For example, an imaging system can be implemented to perform eye-tracking to enable gaze detection, which can be used for input control, tunable focus applications, biometric identification, etc. Such imaging systems have traditionally been implemented as inward-facing cameras configured to image one or both of a user's eyes.

Imaging systems can also be implemented to sense and record information from the environment/scene. For example, outward-facing, or world-facing, tracking systems can be implemented to record image data from the environment. Typically, the outward-tracking system is configured to acquire stereo image data that simulates what the user's eyes see in their real-world field-of-view. Such image data can be utilized in various ways. One example includes processing the image data to determine a depth map, which can be utilized by AR/MR applications for generating digital objects in interactive and realistic ways. In other examples, additionally or alternatively, image data from outward-tracking systems can be utilized to track hand gestures and/or interactions between users and their environment.

The design process for AR/MR near-eye devices generally involves selecting on-device components and systems to implement based on trade-off considerations among size, power consumption, and performance aspects. Implementing multiple systems on a single near-eye device can provide greater functionalities but can also increase requirements in space, power consumption, and thermal management. For example, implementing both eye-tracking and outward-tracking systems presents several challenges. These two systems are typically configured to be persistently active in the background. Constant operation of the physical systems, along with the accompanying computer vision algorithms, can present a challenge in terms of battery consumption and thermal management. Oftentimes, the form factor of the device dictates the maximum battery size/capacity, which in turn can determine the type and number of components that can be implemented in a practical manner. For example, smart goggles may accommodate more and larger components compared to smart glasses. Generally, it is advantageous to minimize the footprint and power consumption of a component when possible, allowing for larger space and power allocations for other components.

Another challenge in implementation of multiple tracking and/or projection systems (e.g., implementing both eye-tracking and outward-tracking systems) includes the calibration of such systems due to alignment issues. With near-eye devices that have non-perfectly rigid frames (e.g., lightweight AR glasses), there may be issues of bending or other deformations that cause changes in the relative positions of the systems to the display. As such, there is often a need for online calibration processes to reduce the deviation error.

In view of the observations above, implementations of camera architectures for combined eye-tracking and outward-tracking are provided. Compared to implementing eye-tracking and outward-tracking using separate systems, a combined camera architecture can provide reduced device weight and power consumption, leading to better thermal management. Furthermore, such architectures can reduce the need for online calibration to account for alignment issues. For the purposes of this disclosure, references to a specific near-eye device form factor can be applied to any near-eye device form factor. For example, discussion directed towards AR glasses may also be applied to any other head-mounted displays, including goggles, monocular displays, etc.

Camera architectures for combined eye-tracking and outward-tracking can be implemented in various ways. In some implementations, an image sensor (e.g., a camera) is placed at either side of the temple arm positions of a near-eye device, such as a pair of AR glasses. In traditional devices, eye-tracking is typically performed using an inward-facing image sensor, and environment capture is performed using an outward-facing image sensor. To implement a combined architecture, the techniques described herein utilize reflections of the eye to perform eye-tracking and environment capture using a single outward-facing imaging system. In such implementations, the image sensor is disposed on a temple arm of the glasses and directed towards a lens of the glasses, facing outward. The lens includes an optical element, such as a hot mirror coating, a holographic optical element (HOE), etc., that can reflect or diffract eye images towards the camera(s). To sense both eye images and environment images, the image sensor utilizes a color filter array (CFA) that contains a pattern of filters. The CFA includes at least two sets of filters in a predetermined pattern that enables the image sensor to capture both eye images and environment images, combining such functions using one imaging system.

Turning now to the drawings, implementations of camera architectures for combined eye-tracking and outward-tracking are depicted and described in further detail. Unless stated otherwise, the drawings are depicted for illustrative purposes and are not drawn to scale. FIG. 1 shows a schematic view of an example near-eye device 100 implementing combined eye-tracking and outward-tracking. The example near-eye device 100 can be implemented in various form factors, including but not limited to eyeglasses, goggles, monocular displays, and other head-mounted displays. The example near-eye device 100 includes processing circuitry 102 and memory 104 storing instructions for controlling various components of the example near-eye device 100. For example, the near-eye device 100 further includes an image projector 106 and an imaging system 108, both of which can be controlled by the stored instructions. As can readily be appreciated, the example near-eye device 100 can also include non-depicted components for providing various functionalities, such as but not limited to additional image projectors, additional imaging systems, batteries, proximity detectors, etc.

The example near-eye device 100 can be configured to implement various AR/MR applications. In the depicted example, the near-eye device 100 includes at least one lens 110 that is at least partially transparent. The lens 110 can be implemented in various ways. In some implementations, the lens 110 is flat. In other implementations, the lens 110 is curved, or a portion of the lens 110 is curved. The lens 110 may include various layers and optical components for performing various functions. For example, the lens 110 may include a layer with spherical power for correcting vision.

Utilizing the image projector 106, image light containing digital content can be projected onto a user's eye. This overlays the digital content on top of the user's real-world field-of-view through the lens 110, enabling AR/MR applications. The image projector 106 can be implemented in various ways. In some implementations, the image projector 106 is configured to project image light containing digital content directly onto the eye of the user. Alternatively, the image projector 106 can project image light towards the lens 110. In such cases, the lens 110 can be implemented to include one or more optical elements for redirecting the projected image light towards the eye of the user. Various types of optical elements can be utilized. In some implementations, the lens 110 includes a waveguide layer containing optical elements for redirecting the projected image light. Example optical elements include gratings (e.g., holographic, surface relief, etc.), mirrors, prisms, filters, etc.

To enable combined eye-tracking and outward-tracking capabilities, the example near-eye device 100 includes an imaging system 108. To implement eye-tracking, the imaging system 108 includes an eye illuminator 112 for illuminating a user's eye. Various types of illumination light can be utilized. For example, in some implementations, eye-tracking is implemented using infrared (IR) illumination, which can be defined as light belonging to a region of the electromagnetic spectrum that ranges from about 780 nanometers to about one millimeter. In some implementations, the eye illuminator 112 outputs near-infrared (NIR) illumination, which can be defined as light belonging to a region of the electromagnetic spectrum that ranges from about 780 nanometers to about 2500 nanometers. The reflection off the user's eye can then be imaged by an image sensor 114 to perform eye-tracking. Various types of image sensors can be implemented. Generally, the image sensor 114 is a sensor that detects light signals to generate an output that can be converted/formatted into an image. For example, the image sensor 114 can be implemented as part of a camera module on the near-eye device 100.

Various types of eye-tracking algorithms can be used. In some implementations, the eye-tracking algorithm tracks the user's pupil through computer vision techniques. For example, glints, or the reflections of light on the cornea, can be detected and tracked to determine the pupil's position. Gaze detection can also be implemented. In some implementations, the example near-eye device 100 includes a second imaging system that can perform eye-tracking on a second eye of the user. For example, the near-eye device 100 can be implemented in an eyeglasses form factor that includes two lenses. The temple arms of the eyeglasses can each hold an imaging system that tracks a respective eye of the user.

In addition to eye-tracking, the imaging system 108 can be configured to perform outward-tracking to image an environment. To process incoming light signals from the reflected illumination light off the user's eye and from environment light, the imaging system 108 includes a color filter array 116 that contains a pattern of filters. Various types of filters can be implemented, including low-pass, high-pass, and band-pass filters. The pattern forms a super-pixel that can image light signals from both sources. For example, in implementations where NIR illumination is utilized for eye-tracking, the CFA 116 can include a first set of filters for allowing NIR light to pass and a second set of filters for allowing visible light to pass. Visible light can be defined as light belonging to a region of the electromagnetic spectrum that ranges from about 380 nanometers to about 750 nanometers. The filters can be arranged in an alternating pattern, and a non-repeating section of the pattern forms a super-pixel capable of sensing light signals from the reflected illumination light off the user's eye and from environment light. CFA patterns and associated variations are depicted and described in FIGS. 8A-8C and the accompanying descriptions.

Figure 2:
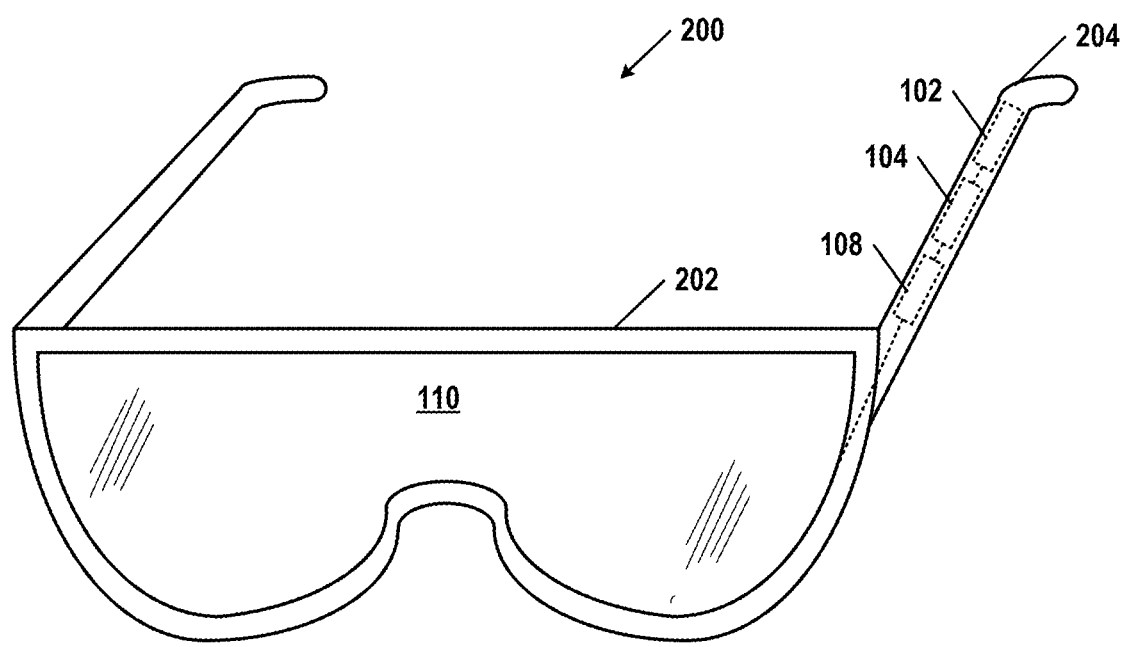
FIG. 2 shows an example eyeglasses form factor of a near-eye device, which can be implemented as the example near-eye device of FIG. 1.

Turning now to FIG. 2, an example form factor of the near-eye device 100 is shown. In the depicted example, the near-eye device is in the form of eyeglasses 200 with a single large lens 110 for both eyes. The lens 110 is mounted within a frame 202 of the eyeglasses 200. The eyeglasses 200 house processing circuitry 102 and memory 104 within a temple 204 of the frame 202. As can readily be appreciated, such components can be housed in various locations, such as in the rim (if large enough). The processing circuitry 102 and memory 104 are communicatively coupled to various components on the eyeglasses 200, including an imaging system 108 and the lens 110, via an electrical connection (shown in dashed lines). As can readily be appreciated, the example eyeglasses 200 can include other components (not shown) for providing various functionalities. For example, the eyeglasses 200 can further include an ambient light sensor, a proximity sensor, integrated batteries, etc. Furthermore, although the example eyeglasses 200 is depicted with a single imaging system 108, dual-imaging systems can also be implemented. For example, the other temple arm can be implemented to house a second imaging system, which can perform eye-tracking for the other eye of the user.

Figure 3:
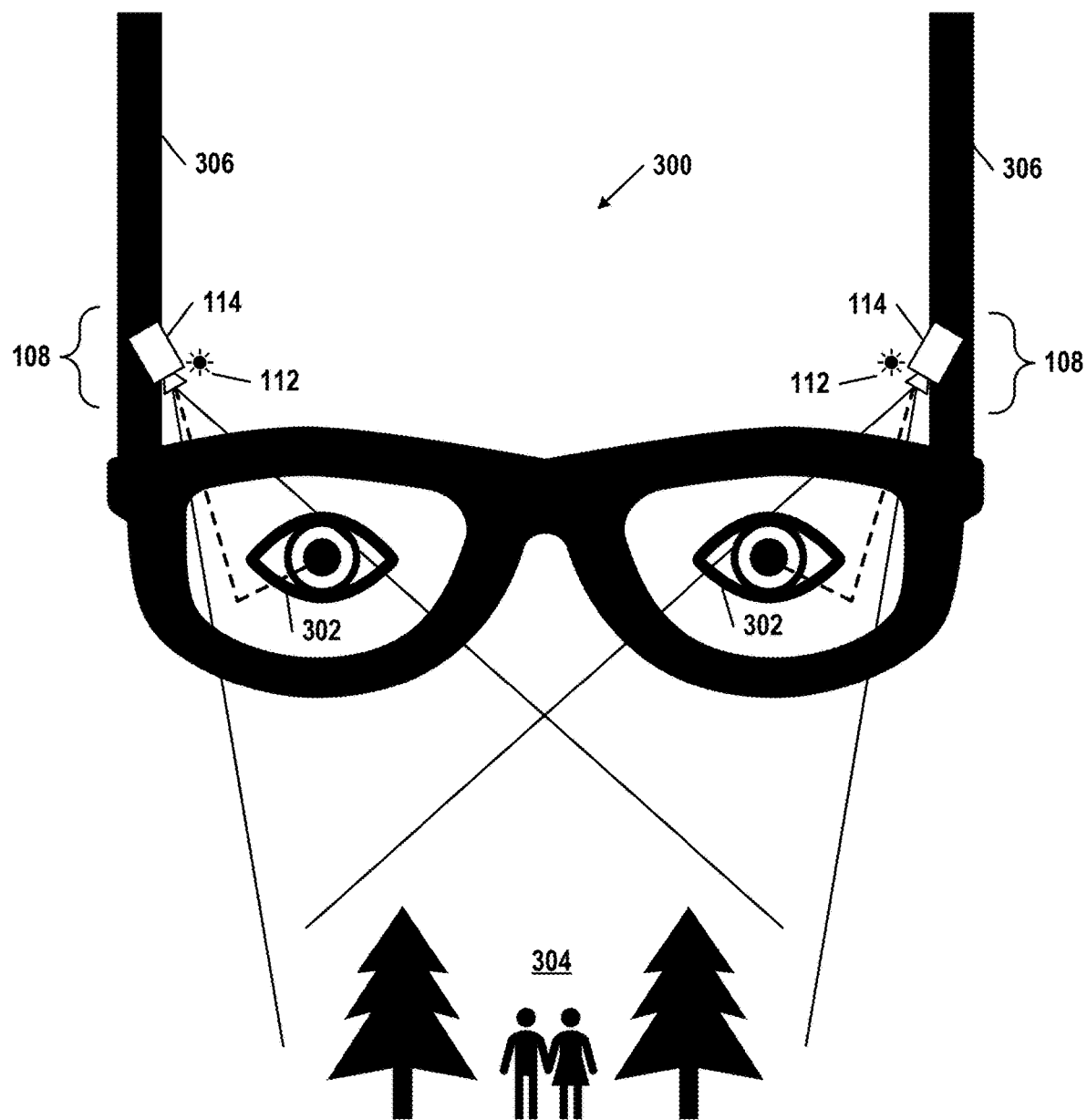
FIG. 3 shows a diagram depicting an example near-eye device imaging a user's eyes and the environment, which can be implemented using the example near-eye device of FIG. 1.

FIG. 3 shows a diagram depicting an example near-eye device 300 imaging a user's eyes 302 and the environment 304. The example near-eye device 300 is in the form of binocular eyeglasses that include two temple arms 306, each of which houses an imaging system 108. Implementing dual imaging systems 108 allows for the collection of stereo image data that can enable various applications, including but not limited to depth estimation and hand-tracking. Each of the imaging systems 308 includes an imaging sensor 114 that is outward-facing and directed towards a respective lens. The lenses are at least partially transparent to visible light, allowing the user to have a real-world field-of-view and the imaging sensors 114 to sense visible light from the environment 304.

In addition to imaging the environment, the imaging systems 108 can be configured to also perform eye-tracking. In the depicted example, each of the imaging systems 108 includes an eye illuminator 112 configured to image a respective eye 302. The eye illuminators 112 can be implemented in various ways. For example, the eye illuminators 112 can be placed in various positions, such as around the frame, in the bridge, or embedded in the lenses. In the depicted example, the eye illuminators are placed near the imaging sensors 114 (co-located). The eye illuminator 112 can output illumination light based on the eye-tracking implementation. In some implementations, the eye illuminator 112 outputs non-visible light, such as IR or NIR light.

In the depicted example of FIG. 3, the eye illuminators 112 are co-located with respective image sensors 114. In such cases, the eye illuminators 112 and the image sensors 114 can utilize similar ray paths (depicted with dashed lines) to respectively illuminate and image the eyes. The depicted ray paths include a path from an image sensor 114/eye illuminator 112 to the lens. The path is then reflected towards an eye 302. The eye illuminators 112 may utilize such paths to illuminate the user's eyes 302. Reflections off the eyes 302 can reach the image sensors 114 through similar paths. Reflections off the lenses can be enabled in various ways. In some implementations, each of the lenses includes a coating configured to reflect light output by the eye illuminators 112, which would also reflect illumination light that is reflected off the user's eyes. For example, in implementations where eye-tracking is performed using NIR light and the eye illuminators 112 output such light, the coating can be a hot mirror coating configured to reflect IR and/or NIR light while allowing light of other wavelengths, such as visible light from the environment, to pass. Other optical elements can also be used to redirect light that is incident on the lenses. For example, a surface relief grating can be implemented to reflect incident NIR light. In some implementations, each of the lenses includes a holographic optical element, such as holographic gratings, mirrors, prisms, etc., that can reflect NIR light. FIGS. 4-7 show example lens architectures for implementations with camera architectures for combined eye-tracking and outward-tracking.

Figure 4:
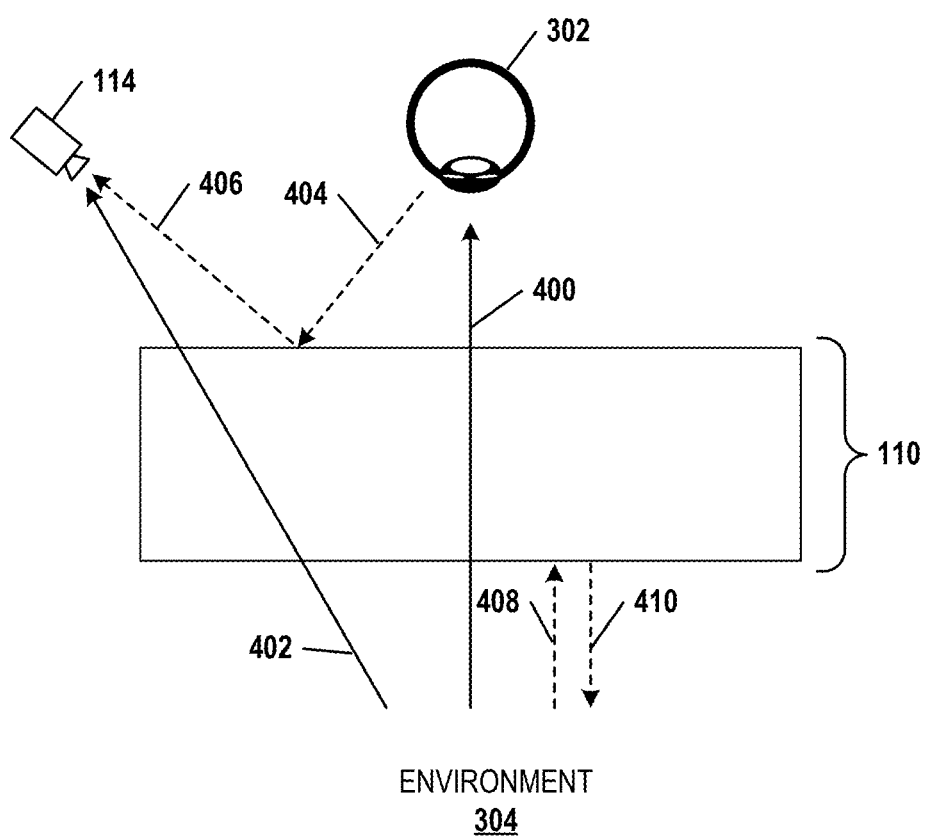
FIG. 4 shows a schematic top view of an example camera architecture imaging an eye and the environment through a lens, which can be implemented in the example near-eye device of FIG. 1.

FIG. 4 shows a schematic top view of an example camera architecture imaging an eye 302 and the environment 304 through a lens 110. The camera architecture includes an image sensor 114 configured to image an eye 302 of a user and the environment 304 through the lens 110. In the example of FIG. 4, the lens 110 is depicted as a flat lens. In other implementations, the lens 110 is curved, or a portion of the lens 110 is curved. Generally, the lens 110 is at least partially transparent to visible light, allowing the user to see the real world (illustrated by solid ray 400). Similarly, the visible light from the environment 304 can travel to the image sensor 114 through the lens 110 (illustrated by solid ray 402). This enables the image sensor 114 to sense the environment 304, converting visible light into digital image data. In some implementations, the lens 110 includes a visible light anti-reflection coating on one or both sides of the lens 110, which can improve the transmission of visible light.

Contemporaneously with the imaging of the environment 304, the image sensor 114 can image the eye 302 in various ways. In the depicted example, reflections of illumination light off the eye 302 (e.g., caused by illuminating the eye 302 with an eye illuminator) are directed towards the lens 110 (illustrated by dashed ray 404) where it is then redirected towards the image sensor 114 (illustrated by dashed ray 406). To prevent environmental noise (e.g., environmental light with similar wavelengths as the illumination light), the lens 110 can include an optical element for reflecting light utilized for eye-tracking (illustrated by dashed rays 408, 410). For example, if eye-tracking is performed using NIR light, the lens 110 can include a coating that reflects IR and/or NIR light.

Figure 5:
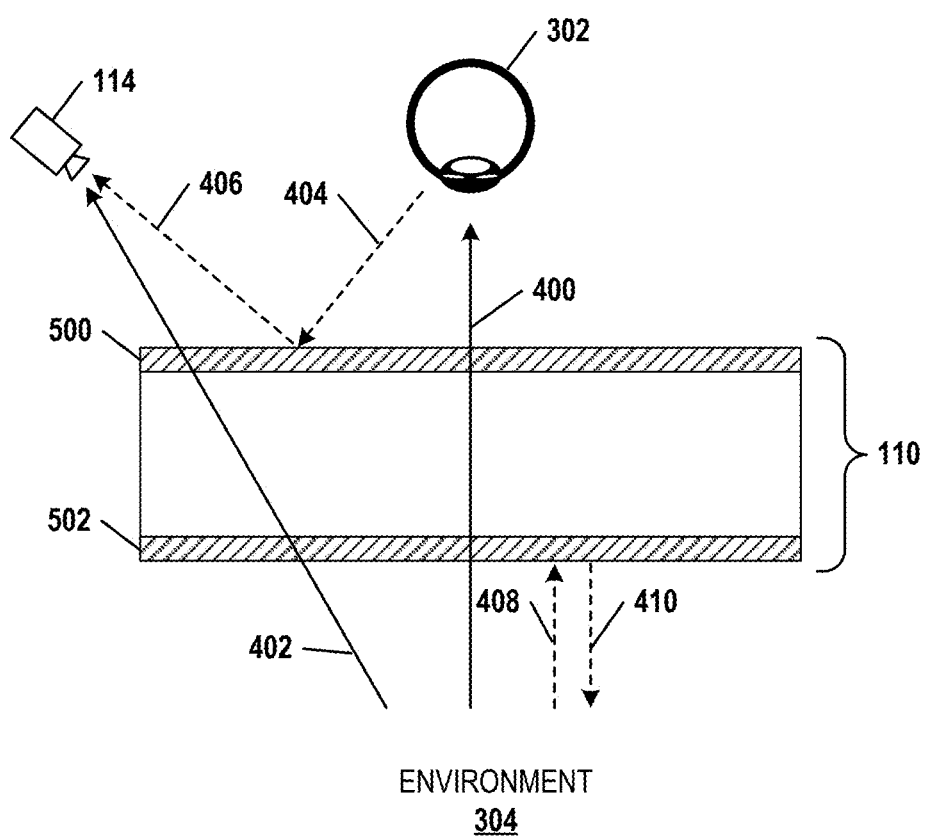
FIG. 5 shows a schematic top view of an example camera architecture imaging an eye and the environment through a lens with a hot mirror coating, which can be implemented in the example near-eye device of FIG. 1.

The lens 110 can be configured to redirect incident illumination light in various ways (e.g., dashed rays 404, 406). For example, the lens 110 can include a hot mirror coating configured to reflect IR and/or NIR light. FIG. 5 shows a schematic top view of an example camera architecture imaging an eye 302 and the environment through a lens 110 with a hot mirror coating 500. Solid ray 404 represents illumination light that has been reflected off of the user's eye 302. Eye-tracking can be performed using illumination light of various wavelengths. In the depicted example, the illumination light is NIR light, and the hot mirror coating 500 is configured to reflect such light. As shown, solid ray 404 is incident upon the hot mirror coating 500 and is reflected (solid ray 406) towards the image sensor 114.

As described above with respect to FIG. 4, the lens 110 can include an optical element for reflecting environmental light of similar wavelengths to the illumination light. In the depicted example of FIG. 5, the lens 110 includes a coating 502 on the side of the lens 110 facing the environment to reflect environmental IR and/or NIR light (e.g., dashed ray 408). Various types of coatings can be implemented. For example, the lens 110 can include a coating similar to the hot mirror coating 500. In some implementations, the hot mirror coating 500 and the environment coating 502 are respectively configured to optimally reflect NIR light at different incident angles. For example, the hot mirror coating 500 can be configured to have higher reflection efficiency at oblique angles, which can be advantageous given the position of the image sensor 114 relative to the eye 302.

Figure 6:
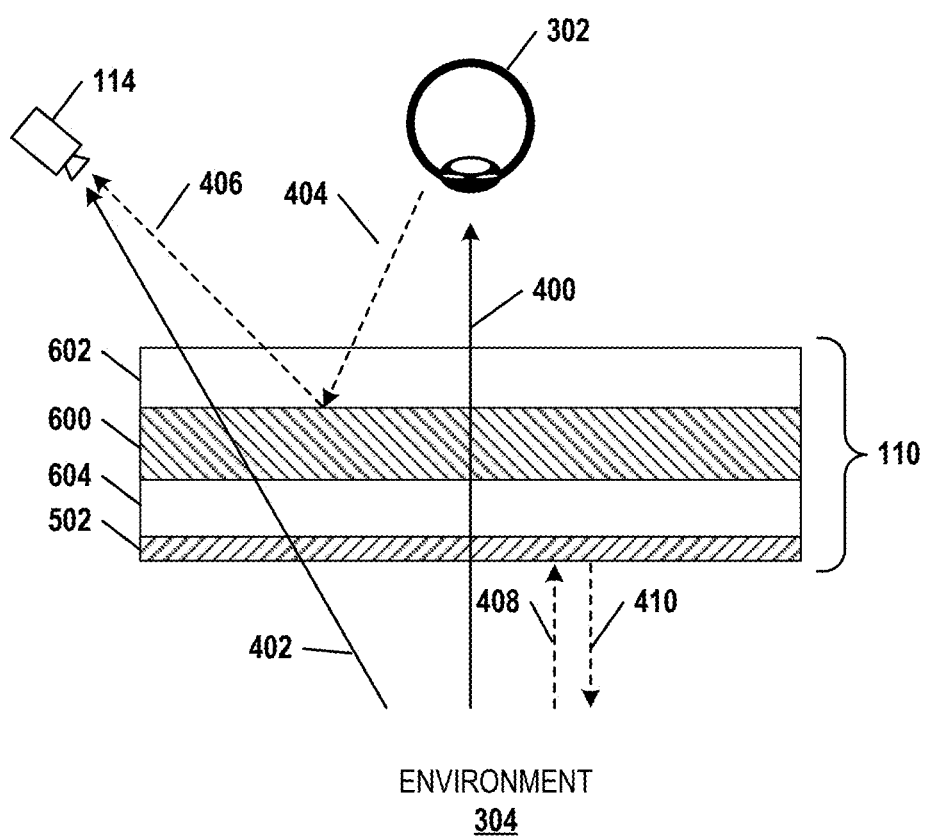
FIG. 6 shows a schematic top view of an example camera architecture imaging an eye and the environment through a lens with a holographic optical element, which can be implemented in the example near-eye device of FIG. 1.

Various types of optical elements can be implemented for redirecting illumination light reflected off a user's eye. For example, instead of the hot mirror coating 500, the lens 110 can include a holographic optical element to reflect or diffract illumination light. FIG. 6 shows a schematic top view of an example camera architecture imaging an eye 302 and the environment 304 through a lens 110 with a holographic optical element 600. The holographic optical element 600 can be implemented in various ways. In the depicted example, the holographic optical element 600 is configured to reflect incident illumination light towards the image sensor 114. The holographic optical element 600 can be designed to be substantially transparent to visible light while reflecting or diffracting the illumination light. For example, the holographic optical element 600 can be designed to have peak reflective/diffractive efficiency in response to NIR light when such light is utilized for eye-tracking. In some implementations, the holographic optical element 600 is designed to have peak reflective/diffractive efficiency to a predetermined angle of incidence. The angle can be calculated, for example, based on the position of the image sensor 114, the eye 302, and the holographic optical element 604.

The holographic optical element 600 can be implemented using various optical structures. In some implementations, the holographic optical element 600 includes an input coupling element and an output coupling element. For example, a prism, a mirror, a grating, or any other appropriate optical structure can be utilized to couple incident light into and out of the lens, thus allowing incident light to be redirected towards an intended direction. In some implementations, the holographic optical element 600 includes one or more grating structures.

In the depicted example of FIG. 6, the holographic optical element 600 is implemented in a layer sandwiched between two transparent layers 602, 604. The transparent layers 602, 604 can be implemented in various ways. One or both of the transparent layers 602, 604 can be glass or plastic. In some implementations, the lens 110 includes more than three layers. Other layer configurations can also be implemented. In some implementations, the combined camera architecture is implemented in a near-eye device that includes a projector for projecting digital content to the user's eyes as an overlay on top of a real-world field-of-view. In such cases, the lens 110 can include a waveguide layer to guide projected image light to the user's eye 302 to provide AR/MR functionalities.

Figure 7:
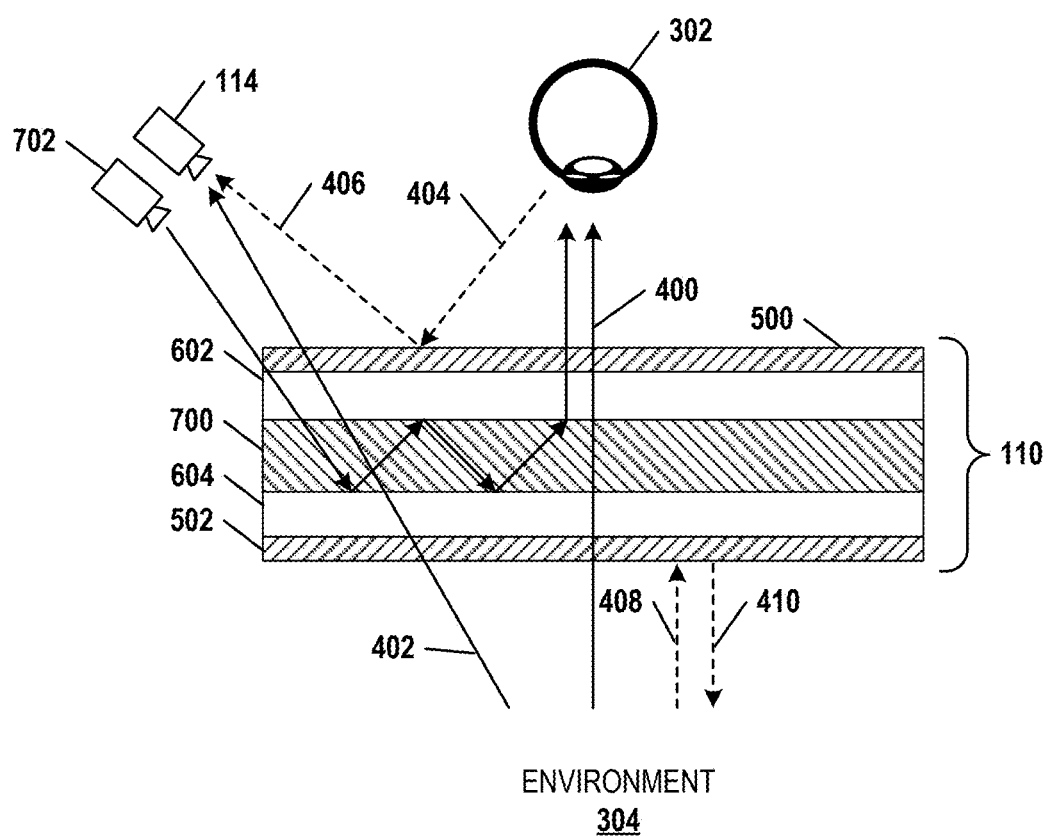
FIG. 7 shows a schematic top view of an example camera architecture imaging an eye and the environment through a lens with a waveguide for directing projected image light to the eye, which can be implemented in the example near-eye device of FIG. 1.

FIG. 7 shows a schematic top view of an example camera architecture imaging an eye 302 and the environment 304 through a lens 110 with a waveguide 700 for directing projected image light to the eye 302. The image light is provided by an image projector 702, which can be configured to generate and project image light containing digital content. In the depicted example, the image projector 702 is outward-facing (i.e., facing the environment). Various techniques can be applied to redirect the projected image light to the user's eye 302. In the depicted example, the waveguide 700 provides an optical structure that in-couples incident light from the image projector 702. The in-coupled light travels through the waveguide 702 until it is out-coupled towards the user's eye 302.

The waveguide 700 can include optical components that are designed to couple light from the image projector 702 with high efficiency while allowing visible light from the environment to pass. This can be performed in various ways. For example, in some implementations, the image projector 702 is a laser projector that projects narrow-band red, green, and blue light. Optical components in the waveguide 700 can be tuned accordingly. In some implementations, the waveguide 700 includes three sets of structures, each set designed to couple one of either red, green, or blue light. The combination of the three sets of structures enables high coupling efficiency for the image light output by the image projector. The optical components can also be tuned to couple light within a range of angles of incidence. Such implementations can enable visible light from the environment to pass more efficiently.

The waveguide 700 can be implemented in various ways with a variety of different optical components. Example optical components for redirecting image light from the projector 702 to the user's eye 302 include but are not limited to gratings, prisms, mirrors, etc. In some implementations, the waveguide 700 includes a plurality of gratings for in-coupling, redirecting, exit pupil expansion, and/or out-coupling. In the depicted example, the waveguide 700 is a waveguide layer sandwiched between two transparent layers 602, 604. In such cases, the gratings can be implemented as holographic gratings. In other implementations, the lens 110 utilizes surface relief gratings.

To enable combined imaging of NIR eye-tracking and outward-facing environment tracking, the image sensor 114 can utilize a color filter array that contains at least two sets of filters in a predetermined array pattern. Various types of filters can be implemented, including low-pass filters, high-pass filters, and band-pass filters. Each of the sets of filters can correspond to either the eye-tracking application or the environment-tracking application. For example, the color filter array can include a first set of filters configured to allow NIR light to pass for eye-tracking applications. The color filter array can also include a second set of filters configured to allow visible light to pass for environment-tracking applications. The color filter array can include the two sets of filters in an alternating pattern. The repeating groups of filters can then be classified as a super pixel that contains at least a pixel worth of image data for each of the applications (e.g., eye-tracking and outward-facing environment tracking). In some implementations, the super-pixel is a two-by-two array containing two pixels for eye-tracking using a first set of filters and two pixels for outward-tracking using a second set of filters. The filtered light can then be sensed by the image sensor 144, and appropriate software can be utilized to derive two sets of image data. This enables a single image sensor, or camera, to provide combined eye-tracking and outward-tracking functionalities in full field-of-views.

Figure 8A:
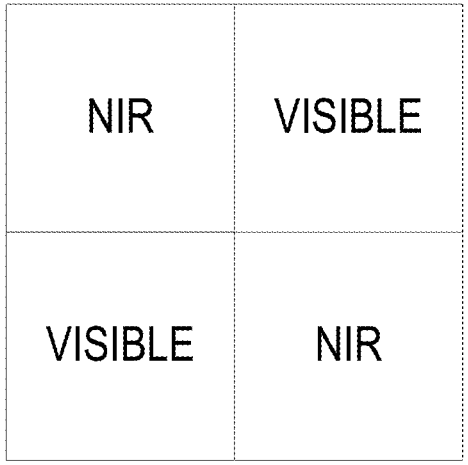
FIGS. 8A-8C show example patterns of color filter arrays, which can be implemented in the example near-eye device of FIG. 1.
Figure 8B:
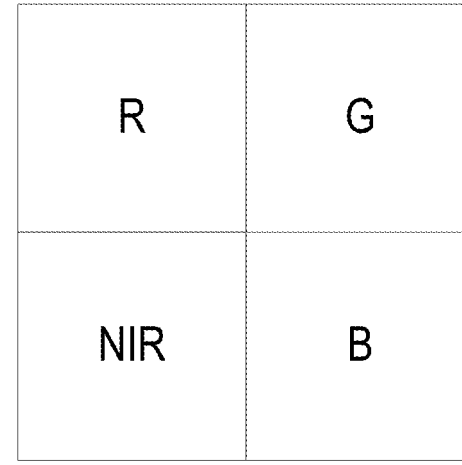
Figure 8C:
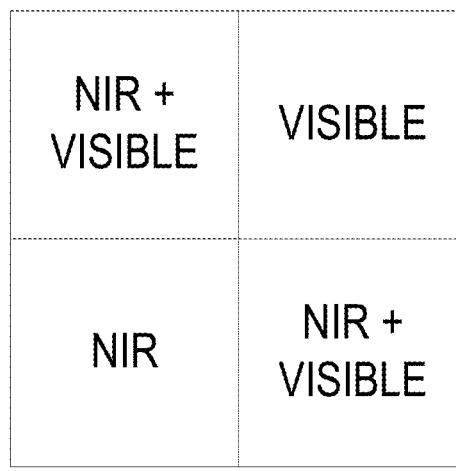

FIGS. 8A-8C show example patterns of color filter arrays. FIG. 8A shows a color filter array pattern with two NIR filters and two visible filters in a two-by-two pattern. The four filters correspond to an area of the image sensor that can be referred to as a super-pixel. Although this can effectively halve the spatial resolution of the image sensor, the repeating super-pixel pattern enables the image sensor to capture both NIR and visible images. Other patterns and types of filters can be implemented. For example, individual filters for red, green, and blue can be utilized to provide outward-tracking in full color. FIG. 8B shows a color filter array pattern with one NIR filter and three color filters for each of red, green, and blue in a two-by-two pattern. In this implementation, the super-pixel is four times the size of a regular pixel and contains information corresponding to one pixel worth of eye-tracking and one pixel worth of full color outward-tracking. Different combinations of CFA patterns can also be used to increase the spatial resolution and image quality. FIG. 8C shows a color filter array pattern with one NIR filter, one visible filter, and two NIR+visible filters in a two-by-two pattern. Using interpolation techniques, the pixels corresponding to the NIR+visible filters can be used to provide an approximation of both an NIR pixel and a visible pixel, enabling higher spatial resolution and image quality. FIGS. 8A-8C illustrate example patterns of color filter arrays that can be utilized. As can readily be appreciated, various other patterns and types of filters can be implemented as appropriate depending on the application. For example, in some implementations, the color filter array includes a four-by-four pattern of filters. In some implementations, the imaging system is implemented with dual readout architecture where the CFA can be designed at the sub pixel level, allowing the sensor to maintain the resolution of images for both visible and NIR applications.

Figure 9:
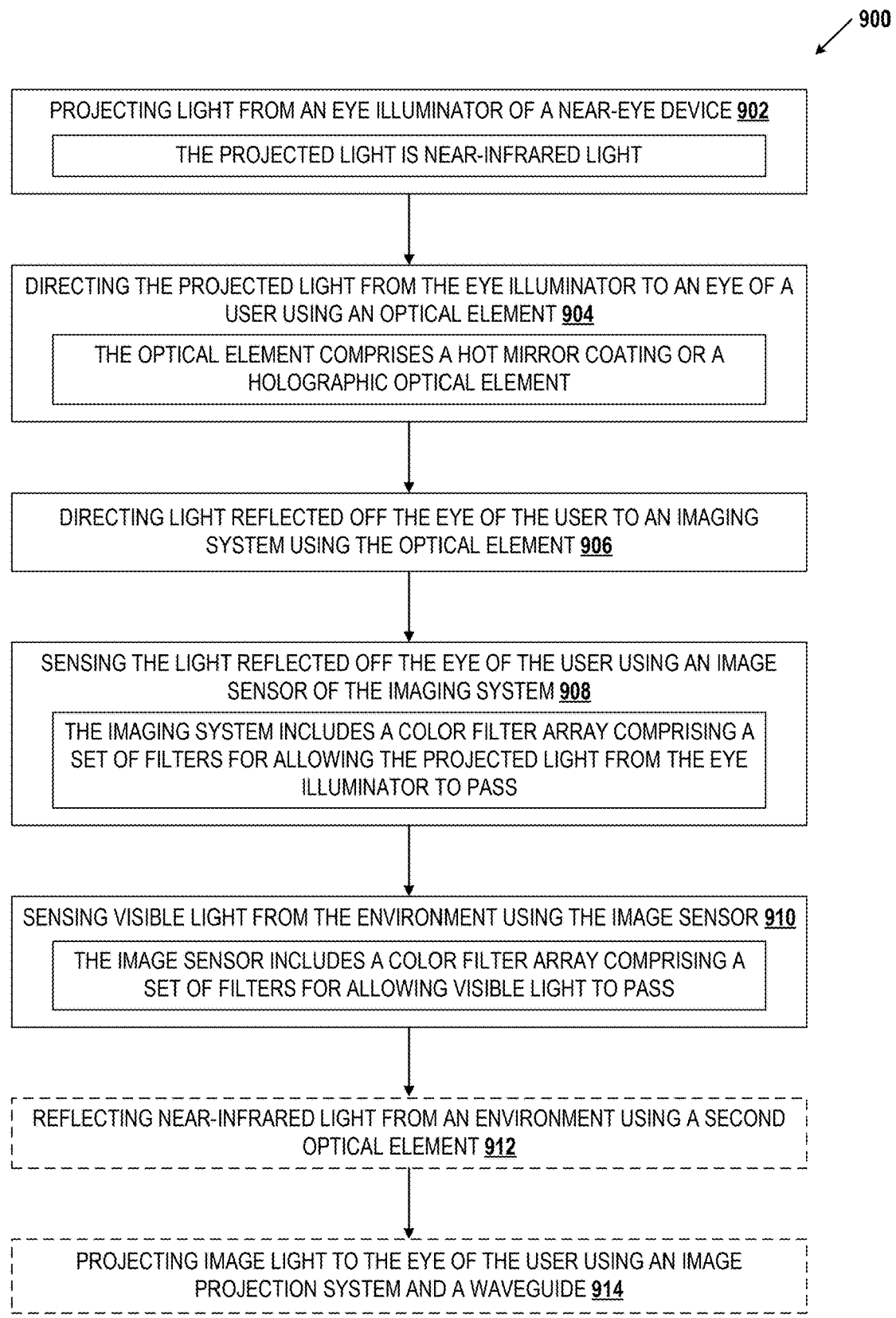
FIG. 9 shows an example process flow diagram for an example method of implementing a camera architecture for combined eye-tracking and outward-tracking, which can be implemented using the example near-eye device of FIG. 1.

FIG. 9 shows an example process flow diagram for an example method 900 of implementing a camera architecture for combined eye-tracking and outward-tracking. The example method 900 includes, at step 902, projecting light from an eye illuminator of a near-eye device. Various types and form factors of near-eye devices can be implemented. Example form factors include eyeglasses, goggles, and monocular displays. The eye illuminator is a light source for illuminating an eye of a user. The eye illuminator can be implemented in various ways. For example, the eye illuminator can be configured to project IR or NIR light. In some implementations, the eye illuminator is directed to be outward-facing. For example, the eye illuminator can be placed on a temple arm of the near-eye device, facing towards a lens. In some implementations, the eye illuminator is placed near the image sensor, enabling both components to utilize similar ray paths. In other implementations, the eye illuminator is inward-facing. For example, the eye illuminator can be placed on a bridge of an eyeglasses near-eye device or embedded within a lens of the near-eye device.

The example method 900 includes, at step 904, directing the projected light from the eye illuminator to an eye of a user using an optical element. In implementations where the eye illuminator is outward-facing, an optical element can be utilized to redirect the illumination light towards the user's eye. Various optical elements can be utilized. In some implementations, the optical element is a hot mirror coating or a holographic optical element. For example, the optical element can be a prism, a holographic mirror, a holographic grating, etc. In some implementations, the optical element is a surface grating that can reflect the illumination light. Generally, the optical element can be tuned to reflect or diffract light within a range of wavelengths. As such, the optical element can be designed and configured to reflect or diffract light corresponding to wavelengths of light output by the eye illuminator. For example, in some implementations, the optical element is designed to have a reflective efficiency above a predetermined threshold for NIR light within a range of angles of incidence.

The example method 900 includes, at step 906, directing light reflected off the eye of the user to an imaging system using the optical element. When the illumination light from the eye illuminator hits the user's eye, a reflection is produced. The reflection that travels in substantially the same path returns to the optical element, and the optical element can redirect it towards an imaging system. In some implementations, the eye illuminator is co-located with the imaging system, and the illumination path and the imaging path are substantially similar.

The example method 900 includes, at step 908, sensing the light reflected off the eye of the user using an image sensor of the imaging system. After the light reflected off the eye of the user is redirected to the imaging system, it passes through a filter before it reaches the image sensor. For example, to perform eye-tracking using NIR light, the eye illuminator projects NIR light onto the user's eye. The reflected light then travels through an NIR filter of the imaging system to prevent environmental and ambient noise to affect the image sensor reading.

The example method 900 includes, at step 910, sensing visible light from the environment using the image sensor. Step 910 can be performed contemporaneously with step 908. For example, the image sensor can sense both eye-tracking images and visible environment images at the same time. To combine different tracking capabilities, the imaging system further includes a color filter array. The color filter array can be implemented to include different filters in a predetermined pattern. Different filters corresponding to different tracking systems can be implemented to enable the image sensor to sense more than one image. For example, the color filter array can include a first set of filters for allowing the projected light from the eye illuminator to pass. The color filter array can also include a second set of filters for allowing visible environment light to pass. The two sets of filters can be arranged in an alternating pattern, allowing the image sensor to sense two different full field-of view images. In some implementations, the color filter array includes a repeating two-by-two pattern of NIR filters and visible filters. In other implementations, the color filter array includes a repeating two-by-two pattern of one NIR filter and three color filters for each of red, green, and blue.

The example method 900 optionally includes, at step 912, reflecting near-infrared light from an environment using a second optical element. To prevent environmental noise, the near-eye device can include a second optical element that reflects NIR light from the environment. This enhances the signal-to-noise ratio for NIR eye-tracking applications by removing non-illumination light from affecting the image sensor's reading of NIR light. Various types of optical elements can be implemented to reflect NIR light from the environment. In some implementations, the second optical element is an IR or NIR blocker coating applied to the outward-facing side of the lens of the near-eye device. For example, the second optical element can be a hot mirror coating. In other implementations, the second optical element is a reflection grating.

The example method 900 optionally includes, at step 914, projecting image light to the eye of the user using an image projection system and a waveguide. The waveguide can include optical components that are designed to couple light from the image projection system with high efficiency while allowing visible light from the environment to pass. The optical components can also be tuned to couple light within a range of wavelengths and/or a range of angles of incidence. The waveguide can be implemented in various ways with a variety of different optical components. Example optical components for redirecting image light from the image projection system to the user's eye include but are not limited to gratings, prisms, mirrors, etc. In some implementations, the waveguide includes a plurality of gratings for in-coupling, redirecting, exit pupil expansion, and/or out-coupling.

The steps of the example method 900 are depicted and described in order. However, certain steps may be performed out of order or contemporaneously with other steps. For example, steps 912 and 914 may be performed at any time or in an on-going manner, independently of other steps. Steps 908 and 910 may be (and generally is) performed simultaneously as the light from eye-tracking and the light from outward-tracking can be sensed at the same time.

The present disclosure describes various embodiments of camera architectures for combined eye-tracking and outward-tracking. Utilizing an optical element that can reflect or diffract reflections off the eye(s) allow for a single outward-facing imaging system to observe both eye images and world images. To enable sensing of both images, the imaging system can implement a color filter array that includes at least two sets of filters, each set designed to target a respective image source (e.g., NIR or visible). Compared to traditional implementations where such functions are implemented in separate imaging systems, a combined camera architecture can provide several advantages, including reduced device weight and power consumption. Furthermore, such architectures can reduce the need for online calibration to account for alignment issues.

In some embodiments, the methods and processes described herein may be tied to a computing system onboard a near-eye device. In particular, such methods and processes may be implemented as a computer-application program or service, an application-programming interface (API), a library, and/or other computer-program product.

Figure 10:
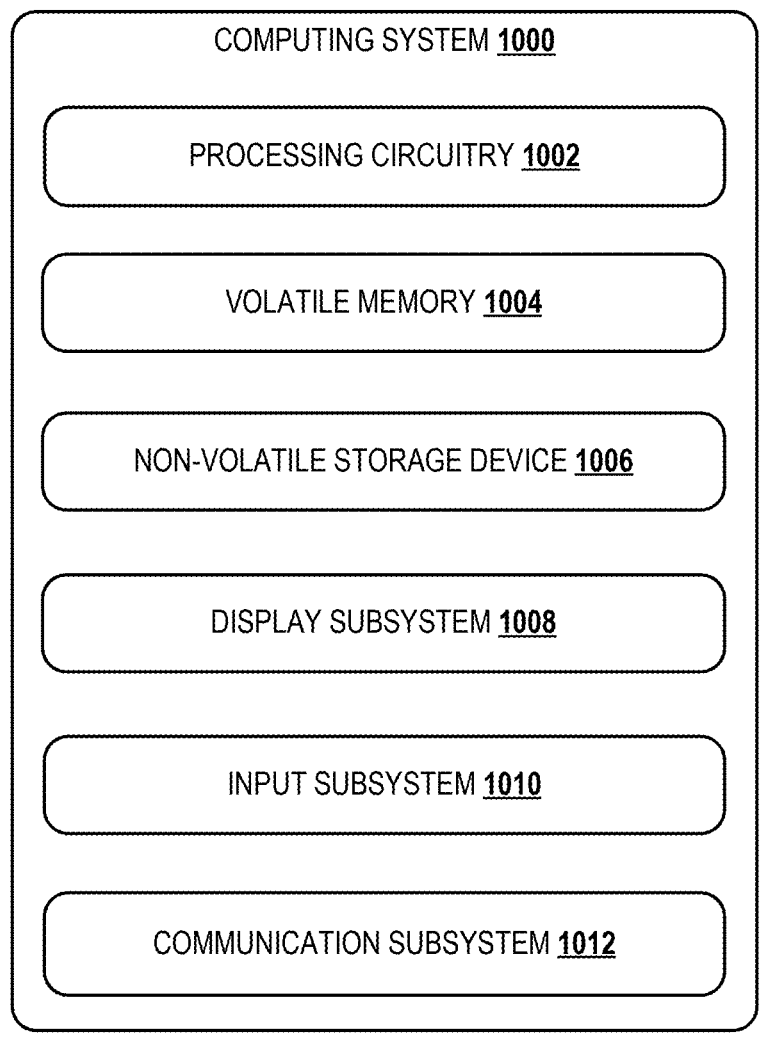
FIG. 10 shows a schematic view of an example computing system that can be implemented in the near-eye device of FIG. 1.

FIG. 10 schematically shows a non-limiting embodiment of a computing system 1000 that can enact one or more of the methods and processes described above. Computing system 1000 is shown in simplified form. Computing system 1000 may be implemented in the near-eye device 100 described above and illustrated in FIG. 1. Computing system 1000 includes processing circuitry 1002, volatile memory 1004, and a non-volatile storage device 1006. Computing system 1000 may optionally include a display subsystem 1008, input subsystem 1010, communication subsystem 1012, and/or other components not shown in FIG. 10.

Processing circuitry 1002 includes a logic processor that can be implemented with one or more physical devices configured to execute instructions. For example, the processing circuitry 1002 may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The processing circuitry 1002 may include one or more physical processors configured to execute software instructions. Additionally or alternatively, the processing circuitry 1002 may include one or more hardware logic circuits or firmware devices configured to execute hardware-implemented logic or firmware instructions. Processors of the processing circuitry 1002 may be single-core or multi-core, and the instructions executed thereon may be configured for sequential, parallel, and/or distributed processing. Individual components of the processing circuitry 1002 optionally may be distributed among two or more separate devices, which may be remotely located and/or configured for coordinated processing. Aspects of the processing circuitry 1002 may be virtualized and executed by remotely accessible, networked computing devices configured in a cloud-computing configuration. In such a case, these virtualized aspects are run on different physical logic processors of various different machines, it will be understood.

Non-volatile storage device 1006 includes one or more physical devices configured to hold instructions executable by the processing circuitry 1002 to implement the methods and processes described herein. When such methods and processes are implemented, the state of non-volatile storage device 1006 may be transformed—e.g., to hold different data.

Non-volatile storage device 1006 may include physical devices that are removable and/or built in. Non-volatile storage device 1006 may include optical memory, semiconductor memory, and/or magnetic memory, or other mass storage device technology. Non-volatile storage device 1006 may include nonvolatile, dynamic, static, read/write, read-only, sequential-access, location-addressable, file-addressable, and/or content-addressable devices. It will be appreciated that non-volatile storage device 1006 is configured to hold instructions even when power is cut to the non-volatile storage device 1006.

Volatile memory 1004 may include physical devices that include random access memory. Volatile memory 1004 is typically utilized by processing circuitry 1002 to temporarily store information during processing of software instructions. It will be appreciated that volatile memory 1004 typically does not continue to store instructions when power is cut to the volatile memory 1004.

Aspects of processing circuitry 1002, volatile memory 1004, and non-volatile storage device 1006 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 typically implemented in software by a processor to perform a particular function using portions of volatile memory, which function involves transformative processing that specially configures the processor to perform the function. Thus, a module, program, or engine may be instantiated via processing circuitry 1002 executing instructions held by non-volatile storage device 1006, using portions of volatile memory 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1008 may be used to present a visual representation of data held by non-volatile storage device 1006. The visual representation may take the form of a graphical user interface (GUI). As the herein described methods and processes change the data held by the non-volatile storage device, and thus transform the state of the non-volatile storage device, the state of display subsystem 1008 may likewise be transformed to visually represent changes in the underlying data. Display subsystem 1008 may include one or more transparent displays utilizing holographic technologies. Such display devices may be combined with processing circuitry 1002, volatile memory 1004, and/or non-volatile storage device 1006 in a shared enclosure, or such display devices may be peripheral display devices.

When included, input subsystem 1010 may comprise or interface with one or more user-input devices such as a keyboard, mouse, touch screen, camera, or microphone. In some implementations, the input subsystem 1010 is implemented via tracking systems. For example, hand-tracking or gaze detection can be used to provide user-input to the system.

When included, communication subsystem 1012 may be configured to communicatively couple various computing devices described herein with each other, and with other devices. Communication subsystem 1012 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 1000 to send and/or receive messages to and/or from other devices via a network such as the Internet.

The following paragraphs provide additional description of the subject matter of the present disclosure. One example includes a near-eye device comprising: a frame comprising an arm; an eye illuminator disposed on the arm of the frame, wherein the eye illuminator is configured to project light to an eye of a user; an imaging system disposed on the arm of the frame, wherein the imaging system comprises: an image sensor; and a color filter array comprising: a first set of filters for allowing the projected light from the eye illuminator to pass; and a second set of filters for allowing visible light to pass; and a lens comprising an optical element for: directing the projected light from the eye illuminator to the eye of the user; and directing light reflected off the eye of the user to the imaging system. In this example, additionally or alternatively, the frame further comprises a second arm, and wherein the near-eye device further comprises: a second eye illuminator disposed on the second arm of the frame, wherein the second eye illuminator is configured to project light onto a second eye of the user; a second imaging system disposed on the second arm of the frame; and a second lens configured to: direct the projected light from the second eye illuminator to the second eye of the user; and direct light reflected off the second eye of the user to the second imaging system. In this example, additionally or alternatively, the projected light from the eye illuminator is near-infrared light. In this example, additionally or alternatively, the lens further comprises a second optical element for preventing near-infrared light from passing through the lens to the imaging system. In this example, additionally or alternatively, the optical element comprises a hot mirror coating or a holographic optical element. In this example, additionally or alternatively, the color filter array further comprises a third set of filters for allowing the projected light from the eye illuminator and the visible light to pass. In this example, additionally or alternatively, the second set of filters comprises: a first subset of filters for allowing substantially red light to pass; a second subset of filters for allowing substantially green light to pass; and a third subset of filters for allowing substantially blue light to pass. In this example, additionally or alternatively, the near-eye device further comprises an image projection system, wherein the lens further comprises a waveguide configured to direct light from the image projection system to the eye of the user. In this example, additionally or alternatively, the lens further comprises: a first visible anti-reflection coating on a first side of the lens; and a second visible anti-reflection coating on a second side of the lens. In this example, additionally or alternatively, the lens is a flat lens.

Another example includes a method enacted on a near-eye device for eye-tracking and outward-tracking, the method comprising: projecting, using an eye illuminator of the near-eye device, light; directing, using an optical element on a lens of the near-eye device, the projected light from the eye illuminator to an eye of a user; directing, using the optical element, light reflected off the eye of the user to an imaging system; sensing, using an image sensor of the imaging system, the light reflected off the eye of the user; and sensing, using the image sensor, visible light from an environment, wherein the imaging system further comprises: a color filter array comprising: a first set of filters for allowing the projected light from the eye illuminator to pass; and a second set of filters for allowing the visible light from the environment to pass. In this example, additionally or alternatively, the method further comprises: projecting, using a second eye illuminator of the near-eye device, light; directing, using a second lens of the near-eye device, the projected light from the second eye illuminator to a second eye of the user; directing, using the second lens, light reflected off the second eye of the user to a second imaging system; and sensing, using the second imaging system, the light reflected off the second eye of the user. In this example, additionally or alternatively, the projected light from the eye illuminator is near-infrared light. In this example, additionally or alternatively, the method further comprises reflecting, using a second optical element of the lens, near-infrared light from the environment. In this example, additionally or alternatively, the optical element of the lens comprises a hot mirror coating or a holographic optical element. In this example, additionally or alternatively, the color filter array further comprises a third set of filters for allowing the projected light from the eye illuminator and the visible light to pass. In this example, additionally or alternatively, the second set of filters comprises: a first subset of filters for allowing substantially red light to pass; a second subset of filters for allowing substantially green light to pass; and a third subset of filters for allowing substantially blue light to pass. In this example, additionally or alternatively, the method further comprises: projecting, using an image projection system, image light; and directing, using a waveguide of the lens, the image light to the eye of the user. In this example, additionally or alternatively, the lens further comprises: a first visible anti-reflection coating on a first side of the lens; and a second visible anti-reflection coating on a second side of the lens.

Another example includes a near-eye device comprising: an eye illuminator configured to project light to an eye of a user; an imaging system comprising: an image sensor; and a color filter array comprising: a first set of filters for allowing the projected light from the eye illuminator to pass; and a second set of filters for allowing visible light to pass; and a lens comprising an optical element for: directing the projected light from the eye illuminator to the eye of the user; and directing light reflected off the eye of the user to the imaging system.

"And/or" as used herein is defined as the inclusive or ∨, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A near-eye device comprising:
a frame comprising an arm;
an eye illuminator disposed on the arm of the frame, wherein the eye illuminator is configured to project light to an eye of a user;
an imaging system disposed on the arm of the frame, wherein the imaging system comprises:
an image sensor; and
a color filter array comprising:
a first set of filters for allowing the projected light from the eye illuminator to pass; and
a second set of filters for allowing visible light to pass; and
a lens comprising an optical element for:
directing the projected light from the eye illuminator to the eye of the user; and
directing light reflected off the eye of the user to the imaging system.

2. The near-eye device of claim 1, wherein the frame further comprises a second arm, and wherein the near-eye device further comprises:
a second eye illuminator disposed on the second arm of the frame, wherein the second eye illuminator is configured to project light onto a second eye of the user;
a second imaging system disposed on the second arm of the frame; and
a second lens configured to:
direct the projected light from the second eye illuminator to the second eye of the user; and
direct light reflected off the second eye of the user to the second imaging system.

3. The near-eye device of claim 1, wherein the projected light from the eye illuminator is near-infrared light.

4. The near-eye device of claim 1, wherein the lens further comprises a second optical element for preventing near-infrared light from passing through the lens to the imaging system.

5. The near-eye device of claim 1, wherein the optical element comprises a hot mirror coating or a holographic optical element.

6. The near-eye device of claim 1, wherein the color filter array further comprises a third set of filters for allowing the projected light from the eye illuminator and the visible light to pass.

7. The near-eye device of claim 1, wherein the second set of filters comprises:
a first subset of filters for allowing substantially red light to pass;
a second subset of filters for allowing substantially green light to pass; and
a third subset of filters for allowing substantially blue light to pass.

8. The near-eye device of claim 1, further comprising an image projection system, wherein the lens further comprises a waveguide configured to direct light from the image projection system to the eye of the user.

9. The near-eye device of claim 1, wherein the lens further comprises:
a first visible anti-reflection coating on a first side of the lens; and
a second visible anti-reflection coating on a second side of the lens.

10. The near-eye device of claim 1, wherein the lens is a flat lens.

11. Enacted on a near-eye device, a method for eye-tracking and outward-tracking, the method comprising:
projecting, using an eye illuminator of the near-eye device, light;
directing, using an optical element on a lens of the near-eye device, the projected light from the eye illuminator to an eye of a user;
directing, using the optical element, light reflected off the eye of the user to an imaging system;
sensing, using an image sensor of the imaging system, the light reflected off the eye of the user; and
sensing, using the image sensor, visible light from an environment, wherein the imaging system further comprises:
a color filter array comprising:
a first set of filters for allowing the projected light from the eye illuminator to pass; and
a second set of filters for allowing the visible light from the environment to pass.

12. The method of claim 11, further comprising:
projecting, using a second eye illuminator of the near-eye device, light;
directing, using a second lens of the near-eye device, the projected light from the second eye illuminator to a second eye of the user;
directing, using the second lens, light reflected off the second eye of the user to a second imaging system; and
sensing, using the second imaging system, the light reflected off the second eye of the user.

13. The method of claim 11, wherein the projected light from the eye illuminator is near-infrared light.

14. The method of claim 11, further comprising:
reflecting, using a second optical element of the lens, near-infrared light from the environment.

15. The method of claim 11, wherein the optical element of the lens comprises a hot mirror coating or a holographic optical element.

16. The method of claim 11, wherein the color filter array further comprises a third set of filters for allowing the projected light from the eye illuminator and the visible light to pass.

17. The method of claim 11, wherein the second set of filters comprises:
a first subset of filters for allowing substantially red light to pass;
a second subset of filters for allowing substantially green light to pass; and
a third subset of filters for allowing substantially blue light to pass.

18. The method of claim 11, further comprising:
projecting, using an image projection system, image light; and
directing, using a waveguide of the lens, the image light to the eye of the user.

19. The method of claim 11, wherein the lens further comprises:
a first visible anti-reflection coating on a first side of the lens; and
a second visible anti-reflection coating on a second side of the lens.

20. A near-eye device comprising:
an eye illuminator configured to project light to an eye of a user;
an imaging system comprising:
an image sensor; and
a color filter array comprising:
a first set of filters for allowing the projected light from the eye illuminator to pass; and
a second set of filters for allowing visible light to pass; and
a lens comprising an optical element for:
directing the projected light from the eye illuminator to the eye of the user; and
directing light reflected off the eye of the user to the imaging system.

* * * * *